United States Patent
Gao et al.

Patent Number: 6,022,609
Date of Patent: Feb. 8, 2000

[54] MAGNETIC RECORDING MEDIUM WITH SUBSTANTIALLY UNIFORM SUB-MICRON-SCALE MORPHOLOGY

[75] Inventors: Chuan Gao, Fremont; Roger Klas Malmhäll, Mountain View; Bing Zhang, Fremont; Kevin Grannen, Pacific; Be Van Ho, San Jose, all of Calif.

[73] Assignee: Seagate Technology, Inc., Scotts Valley, Calif.

[21] Appl. No.: 08/726,296

[22] Filed: Oct. 2, 1996

[51] Int. Cl.[7] .................................................. G11B 5/66
[52] U.S. Cl. .......................... 428/141; 428/336; 428/611; 428/660; 428/666; 428/667; 428/680; 428/694 TS; 428/694 TP; 428/694 ST; 428/694 TM; 428/694 TR; 428/900; 427/128; 427/131; 204/192.2
[58] Field of Search .................................. 428/141, 336, 428/660, 666, 667, 680, 694 TS, 694 ST, 694 TM, 694 TP, 694 TR, 611, 900; 204/192.2; 427/128, 131.1

[56] References Cited

U.S. PATENT DOCUMENTS

| | | | |
|---|---|---|---|
| 5,049,451 | 9/1991 | Lal | 428/611 |
| 5,063,120 | 11/1991 | Edmonson | 428/694 BU |
| 5,069,983 | 12/1991 | Nakamura | 428/611 |
| 5,082,747 | 1/1992 | Hedgcoth | 428/611 |
| 5,118,564 | 6/1992 | Shinohara | 428/336 |
| 5,298,324 | 3/1994 | Ivett | 428/336 |
| 5,314,745 | 5/1994 | Okumura | 428/336 |
| 5,344,706 | 9/1994 | Lambeth | 428/336 |
| 5,492,745 | 2/1996 | Yokoyama | 428/65.3 |
| 5,494,722 | 2/1996 | Oka | 428/65.3 |
| 5,605,733 | 2/1997 | Ishikawa | 428/65.3 |
| 5,626,943 | 5/1997 | Tenhover | 428/141 |

OTHER PUBLICATIONS

Kreichelt, "Nucleation and Growth of Thin Films," Vacuum, vol. 38, No. 12, pp. 1083–1099 (1988).

Bauer et al., Materials Reports, "Fundamental issues in heteroepitaxy—A Department of Energy, Council on Materials Science Panel Report," J. Mater. Res., vol. 5, No. 4, Apr. 1990, pp. 852–856.

J.A. Venables et al., "Nucleation and growth of thin films," Rep. Prog. Phys., vol. 47, 1984, pp. 399–405.

*Primary Examiner*—Leszek Kiliman
*Attorney, Agent, or Firm*—McDermott, Will & Emery

[57] ABSTRACT

The signal-to-noise ratio of a magnetic recording medium having a thin magnetic layer is improved by adjusting the deposition conditions of the underlayer so that the magnetic layer is pseudo-epitaxially grown with a substantially uniform sub-micron-scale morphology. Uniform sub-micron-scale morphology can be attained by strategic selection of the underlayer and magnetic layer materials, and by controlling the underlayer deposition conditions so that the magnetic layer is epitaxially grown by a growth mechanism which is predominantly layer by layer. In an embodiment of the present invention, an underlayer comprising an alloy of chromium with vanadium, titanium or manganese, or an underlayer comprising a nickel-aluminum alloy, is sputter deposited at a pressure less than about 10 mTorr, substrate temperature greater than about 300° C. and substrate bias greater than about 300 V, and a cobalt magnetic layer is epitaxially grown thereon, predominantly layer by layer.

24 Claims, 7 Drawing Sheets

MAGNETIC RECORDING MEDIUM WITH SUBSTANTIALLY UNIFORM SUB-MICRON-SCALE MORPHOLOGY

TECHNICAL FIELD

The present invention relates to the recording, storage and reading of magnetic data, particularly rotatable magnetic recording media, such as thin film magnetic disks for contact with cooperating magnetic transducer heads. The invention has particular applicability to a magnetic recording medium comprising a thin magnetic layer and exhibiting a high areal recording density and low medium noise.

BACKGROUND ART

In terms of coercivity (Hc), product of remanence and film thickness (Mr S), coercivity squareness (S*), media signal-to-noise ratio (SNR) and off-track capability (OTC), it is difficult to make films satisfying all such requirements, especially for the SNR and OTC, in the high linear density regime.

Linear recording density can be increased by increasing the media coercivity, reducing the product of remanence and film thickness (Mrt) and reducing the head flying height which requires flatter and smoother media substrates. However, the media noise has been found to increase dramatically with linear density. Therefore, the media noise has become a road barrier to ultra-high areal density recording. Media noise, originating from exchange coupling among magnetic grains, is a dominant factor restricting increased recording density of high density magnetic hard disk drives. Studies have shown that media noise is attributed primarily to intergranular exchange coupling and larger distribution of medium magnetic grain size, but little has been emphasized on the morphology of the media and topography of the film surface. As the areal recording density increases and as magnetoresistance recording (MR) technology is employed, media Mrt reduces and magnetic film thickness decreases, thereby increasing the significance of morphology and topography effects on media performance. In order to increase linear density, one has to grow films in a controlled manner to obtain a suitable microstructure, i.e., crystallographic orientation, grain size, morphology and topography, therefore minimizing media noise.

A typical longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorous (NiP). Alternative substrates include glass, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective carbon overcoat 13, 13' are usually deposited by sputtering techniques performed in an apparatus containing sequential deposition chambers. A conventional Al-alloy substrate is provided with a NiP plating, primarily to increase the hardness of the Al substrate, serving as a suitable surface for polishing to provide a texture, which is substantially reproduced on the disk surface.

As previously mentioned, another important approach is to lower the recording head flying height or minimize the physical spacing between the head and media. This requires the surface of the substrate to be flatter and smoother. The requisite spacing has approached less than one micron. In this regime, the media topography and morphology have become increasingly more important. As thin film recording technology rapidly evolves, non-magnetic substrates are being fabricated with smoother topography and magnetic layers of decreasing thickness. The flying height or gap between recording head and media decreases, thereby exacerbating the impact of film morphology on film growth and the preparation of the media. Accordingly, there exists a need to produce magnetic recording media from a basic film growth view point, to grow films with better morphology, homogeneity and film integrity in addition to satisfying all the other crystallographic lattice match requirements for high areal density, and for an efficient method of manufacturing a high signal-to-noise ratio (SNR) magnetic recording medium.

DISCLOSURE OF THE INVENTION

An object of the present invention is a magnetic recording medium having a thin magnetic layer and exhibiting a high SNR.

Another object of the present invention is a method of manufacturing a magnetic recording medium exhibiting a high SNR by controlling the growth mechanism of both the underlayer and magnetic layers.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising: a non-magnetic substrate; an underlayer formed on the magnetic substrate; and a magnetic layer, having a surface energy less than that of the underlayer and a thickness less than about 400 Å, pseudo-epitaxially grown on at least a substantially isotropically smooth portion of the underlayer and having a substantially uniform sub-micron-scale morphology.

Another aspect of the present invention is a magnetic recording medium comprising: a non-magnetic substrate; an underlayer formed on the non-magnetic substrate; and a magnetic layer, having a surface energy less than that of the underlayer and a thickness less than about 400 Å, pseudo-epitaxially grown, predominantly layer by layer, on at least a substantially isotropically smooth portion of the underlayer and having a substantially uniform sub-micron-scale morphology.

A further aspect of the present invention is a method of manufacturing a magnetic recording medium, which method comprises: depositing a non-magnetic underlayer on a non-magnetic substrate; and pseudo-epitaxially growing a magnetic layer, having surface energy less than that of the underlayer and a thickness less than about 400 Å, on at least a substantially isotropically smooth portion of the underlayer, so that the pseudo-epitaxially grown magnetic layer exhibits a substantially uniform sub-micron-scale morphology.

Another aspect of the present invention is a method of manufacturing a magnetic recording medium, which method comprises: depositing a non-magnetic underlayer on a non-magnetic substrate; and pseudo-epitaxially growing a non-magnetic layer, predominantly layer by layer, having surface energy less than that of the underlayer and a thickness less than about 400 Å, on at least a substantially isotropically smooth portion of the underlayer, so that the pseudo-epitaxially grown magnetic layer exhibits a substantially uniform sub-micron-scale morphology.

Additional objects and advantages of the present invention will become readily apparent to those skilled in this art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
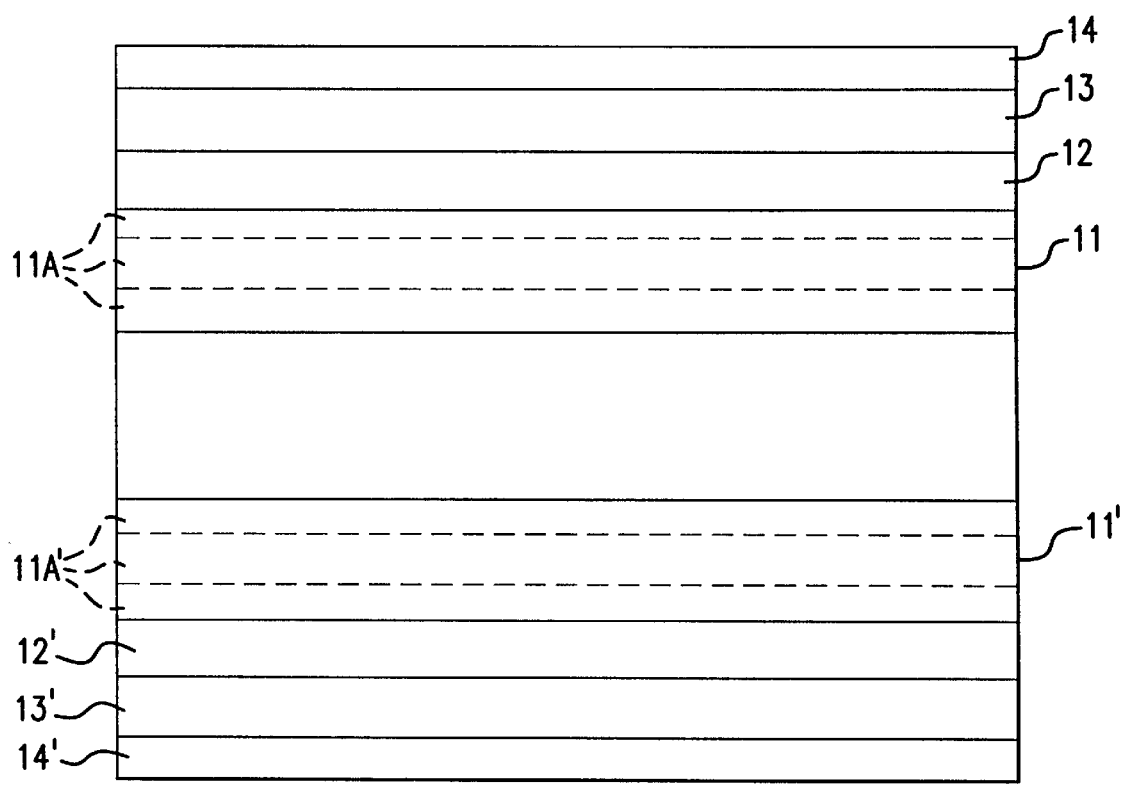
FIG. 1 schematically depicts a conventional magnetic recording medium.

The continuing evolution of thin film recording technology requires magnetic recording media comprising substrates with increasingly smoother topography, thinner magnetic layers and smaller flying heights. As the areal recording density of magnetic recording media increases, the thickness of the magnetic layer decreases accordingly. However, it was found that as the thickness of the magnetic layer decreases, film mechanical integrity, film homogeneity and morphology uniformly become increasingly difficult to control. Non homogeneous magnetic films result in high media noise. Thus, at a high areal recording density regime, medium noise becomes an unavoidable road barrier. The increased effect of magnetic film morphology on medium noise becomes particularly significant as the thickness of the magnetic layer is reduced below about 400 Å. It is, therefore, important to form a thin uniform magnetic layer with a small grain microstructure to satisfy the high SNR requirement of such thin film magnetic recording media. This objective becomes problematic employing conventional sputtering technology which requires high adatom mobility.

The present invention addresses the problem of increasing the SNR as the thickness of a magnetic layer decreases, particularly to below about 400 Å. A magnetic recording medium produced in accordance with the present invention comprises a thin magnetic layer exhibiting a substantially uniform sub-micron-scale morphology, thereby enabling attainment of a high SNR. As used throughout the present specification and claims, the expression "uniform sub-micron-scale morphology," as applied to a magnetic layer, means that, on a sub-micron-scale, the deposited magnetic layer exhibits a uniform morphology characterized by the absence of significant three dimensional grain topography and magnetic grain clustering. The expression "uniform sub-micron-scale morphology," further denotes that upon quartering a micrograph of a sectioned sample, as an AFM micrograph, and superimposing the quartered sections, no substantial topographicals distinctions are observed. The magnetic layers of the present invention having uniform sub-micron-scale morphology typically have a significantly reduced average surface roughness ($R_a$), e.g., below about 15 Å.

In an embodiment of the present invention, substantially uniform sub-micron-scale morphology of a magnetic layer is achieved by the strategic selection of the underlayer material and magnetic material for the magnetic layer pseudo-epitaxially grown thereon so that the magnetic layer has a surface energy less than the surface energy of the underlayer, and by controlling the deposition conditions of the underlayer. In an aspect of this embodiment, underlayer deposition conditions are controlled to enable pseudo-epitaxial growth of the magnetic layer thereon by a growth mechanism which is predominantly one atomic layer by one atomic layer, wherein the interaction energy, i.e., cohesion between atoms of the substrate (underlayer) and atoms of the deposited layer (magnetic layer) is greater than the cohesion between atoms of the deposited layer.

Basically, thin films grow by one of three growth mechanisms: (a) island growth, i.e., nucleation of three dimensional clusters (Volmer-Weber); (b) layer by layer growth (Frank-van der Merwe); and (c) Stranski-Krastanov growth, i.e., subsequent three-dimensional clusters grown on a microscopically thin uniform layer. See, for example, Kreichelt, "Nucleation and Growth of Thin Films," Vacuum, Volume 38, No. 12, pp. 1083–1099 (1988); Bauer et al., Materials Reports, "Fundamental issues in heteroepitaxy—A Department of Energy, Council on Materials Science Panel Report," J. Mater. Res., Vol. 5, No. 4, April 1990, pp. 852–856; J. A. Venables et al., "Nucleation and growth of thin films," Rep. Prog. Phys., Vol. 47, 1984, pp. 399–405.

In view of the increasing effect of magnetic layer morphology on SNR with decreasing magnetic layer thickness, experiments and investigations were conducted to determine how to pseudo-epitaxially grow a magnetic layer having a substantially uniform sub-micron-scale morphology on an underlayer, particularly by a growth mechanism which is predominantly layer by layer, i.e., the Frank van der Merwe growth mechanism. As one having ordinary skill in the art would recognize, for longitudinally recording, there are inherent limitations in the selection of the particular underlayer for nucleation and growth of a magnetic layer thereon in the preferred crystallographic orientation, e.g., ($11\bar{2}0$) or ($10\bar{1}1$) and ($10\bar{1}0$).

After extensive experimentation and investigation, it was found that a magnetic layer, such as a cobalt magnetic layer, exhibiting a substantially uniform sub-micron-scale morphology can be pseudo-epitaxially grown on an underlayer with a preferred ($11\bar{2}0$) or ($10\bar{1}1$) and ($10\bar{1}0$) crystallographic orientation by strategic selection of the materials for the underlayer and magnetic layer so that the surface energy of the magnetic layer is less than the surface energy of the underlayer, and by suitable control of the conditions during deposition of the underlayer.

In accordance with the present invention, various combinations of underlayers and magnetic layers can be selected, as long as the surface energy of the magnetic layer is less than the surface energy of the underlayer. By selecting the materials for the underlayer and magnetic layer so that the surface energy of the magnetic layer is less than the surface energy of the underlayer, the cohesion of the atoms of the magnetic layer for the atoms of the underlayer is optimized vis-a-vis cohesion between atoms of the magnetic layer. Thus, in accordance with the present invention, suitable alloys of chromium can be selected, such as an alloy of chromium containing about 5 to about 30% of vanadium, molybdenum, titanium, tantalum, tungsten or manganese, or an alloy of nickel and aluminum, in combination with a suitable cobalt magnetic alloy. The underlayer can comprise an alloy of chromium with one or more elements which increase the surface energy of Cr and simultaneously maintain the Cr (bcc) crystallographic structure for inducing the desired crystallographic orientation and substantially uniform sub-micron-scale morphology in the subsequently deposited magnetic layer. Particularly suitable results are achieved by sputter depositing an alloy of chromium with about 10 to about 30 atomic % of vanadium, or an alloy of nickel and aluminum, in combination with a magnetic layer comprising an alloy of cobalt, chromium and tantalum.

After further extensive experimentation and investigation, it was found that the conditions during deposition of the underlayer, as during sputter deposition, can be controlled so that the subsequently deposited magnetic layer can be pseudo-epitaxially grown thereon by a Frank-van der Merwe growth mechanism which is predominantly layer by layer to achieve a substantially uniform sub-micron-scale morphology. In controlling the deposition conditions during sputter deposition of an underlayer, it was found that the sputtering power pressure, substrate temperature and substrate bias are result effective variables which affect the growth mechanism and, hence, morphology of the magnetic layer pseudo-epitaxially grown on the underlayer. Pseudo-epitaxially grown magnetic layers thus formed in accordance with the present invention advantageously exhibit an average surface roughness ($R_a$) of less than about 15 Å. In accordance with the present invention, epitaxially grown magnetic layers have been produced exhibiting an average $R_a$ less than about 10 Å.

It has been found advantageous to sputter deposit an underlayer at a low pressure, high substrate temperature, and high substrate bias. By optimizing the pressure, substrate temperature and substrate bias, particularly at a low pressure, high substrate temperature and high substrate bias, the subsequently deposited magnetic layer can be pseudo-epitaxially grown predominantly layer by layer, thereby achieving a substantially uniform sub-micron-scale morphology. One having ordinary skill in the art, given the objectives of the present invention, could easily optimize the pressure, substrate temperature and substrate bias to achieve pseudo-epitaxial growth of a subsequently deposited magnetic layer by a growth mechanism which is predominantly layer by layer with an attendant substantially uniform sub-micron-scale morphology. For example, it has been found suitable to sputter deposit an underlayer, such as a chromium alloy or nickel-aluminum underlayer, at a pressure of less than about 10 mTorr, substrate temperature in excess of about 300° C., and substrate bias in excess of about 300 V.

The precise mechanism enabling pseudo-epitaxial growth of a particular magnetic layer on an underlayer by a growth mechanism which is predominantly layer by layer to achieve a substantially uniform sub-micron-scale morphology by controlling conditions during sputter deposition of a particular underlayer is not fully understood. However, it is believed that using appropriate sputtering process conditions and carefully selecting the underlayer, using surface energy mismatch to grow films by F-M mode (Frank Van der Merwe), a two dimensional homogeneous film can be obtained without significant third dimensional variation and with a sub-micron-scale uniform morphology. Thus, by controlling the deposition conditions of a suitably selected underlayer, wetting of the underlayer by the magnetic layer is promoted in the present invention to enhance growth by a mechanism which is predominantly layer by layer.

Accordingly, the present invention provides a magnetic recording media comprising a smooth topography for reduced flying height and a thin magnetic layer, consistent with current demands for increasingly high areal recording density, while also achieving a high SNR by pseudo-epitaxially growing the magnetic layer predominantly layer by layer to achieve substantially sub-micron-scale homogeneous morphology.

EXAMPLE

Two magnetic recording media was prepared employing identical substrates, protective carbon overcoats and magnetic material for the magnetic layer. In an embodiment representing the present invention (Sample 1), a chromium-vanadium alloy underlayer was sputter deposited at a thickness of about 10 to about 50 nm at a pressure of about 3 mTorr, substrate temperature of about 320° C. and substrate bias of about −300 V. A comparison second magnetic recording medium (Sample 2) was prepared by sputter depositing a chromium underlayer at a pressure of about 8 mTorr, substrate temperature of about 250° C. and substrate bias of about −200 V. Sample 1 and Sample 2 were tested to determine their relevant characteristics which are reported in Table 1 below. After testing, Sample 1 and Sample 2 were sectioned and examined under an Atomic Force Microscope (AFM). The sub-micron-scale morphologies of the magnetic layers of Sample 1 and Sample 2, as revealed by AFM micrographs, are also reported in Table 1.

It should be apparent from Table 1, that Sample 1 of the present invention and comparison Sample 2 exhibited a similar coercivity, Mrt and S*. However, Sample 1 of the present invention exhibited a uniform sub-micron-scale morphology, significantly lower $R_a$ and a significantly higher SNR than comparison Sample 2 which exhibited an irregular sub-micron morphology. The results shown in Table 1 reveal a significant difference in SNR by appropriate selection of the underlayer material with respect to the magnetic layer and control of the sputter deposition conditions.

Samples 3 and 4 were prepared with a CrV underlayer having different vanadium contents between 10 and 30 at. % characterized by different surface energies. In addition, sputtering conditions were adjusted to produce flat and smooth underlayers. However, the subsequently deposited Cr/CoCrTa layers, deposited under the same sputtering conditions, were grown into either a morphologically homogeneous (Sample 3) or inhomogeneous (Sample 4) film. As shown in Table 1, Samples 3 and 4 exhibited similar coercivity and Mrt values; however, the medium noise was extremely different. The lower surface roughness ($R_a$) samples shown in Table 1 (Sample 1 and Sample 3) exhibited significantly higher SNRs vis-a-vis Sample 2 and Sample 4.

TABLE 1

| Sample | $R_a$ (Å) | $H_c$ (kOe) | Mrt (emu/cm$^2$) | S* | SNR (dB) |
|---|---|---|---|---|---|
| 1 (invention) | 7 | 2.05 | 1.10 | 0.87 | 19.0 |
| 2 (comparison) | 97 | 2.10 | 1.05 | 0.88 | 12.0 |
| 3 (invention) | 12 | 2.15 | 1.05 | 0.90 | 17.4 |
| 4 (comparison) | 28 | 2.00 | 1.12 | 0.91 | 13.8 |

Figure 2A:
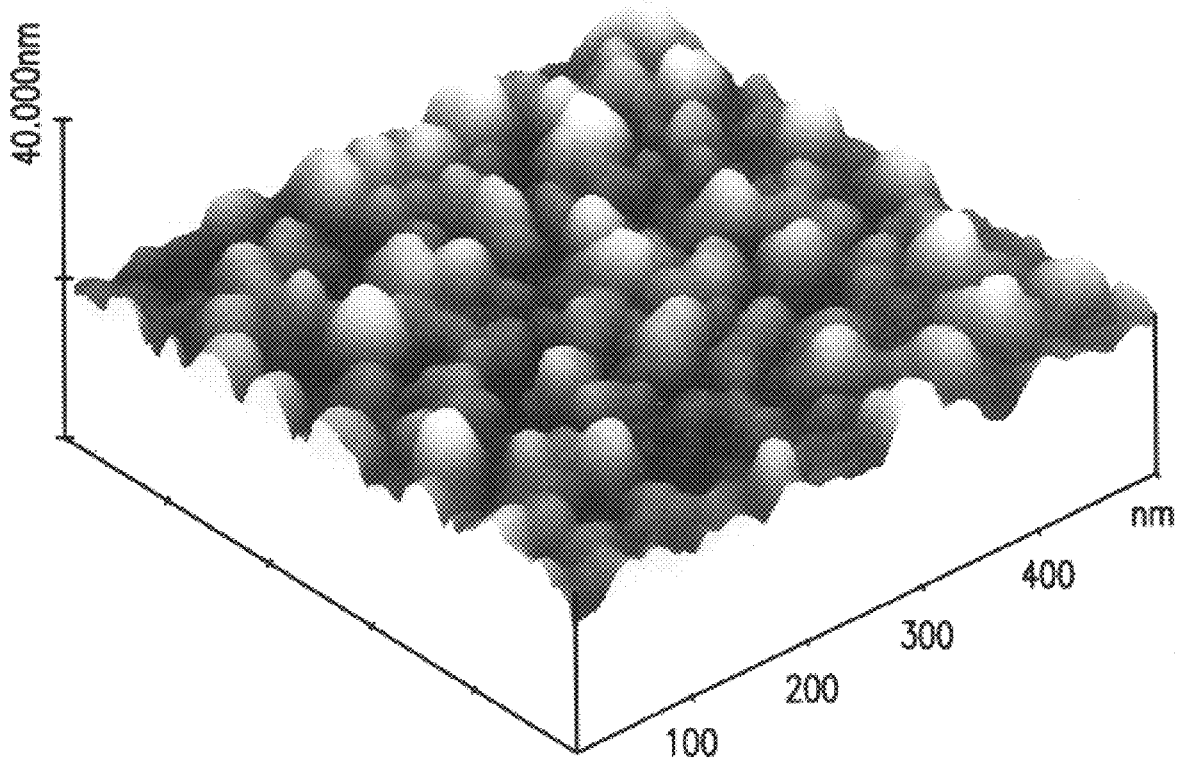
FIGS. 2A–2D represent atomic force microscope (AFM) micrographs of comparison tested samples.
Figure 2B:
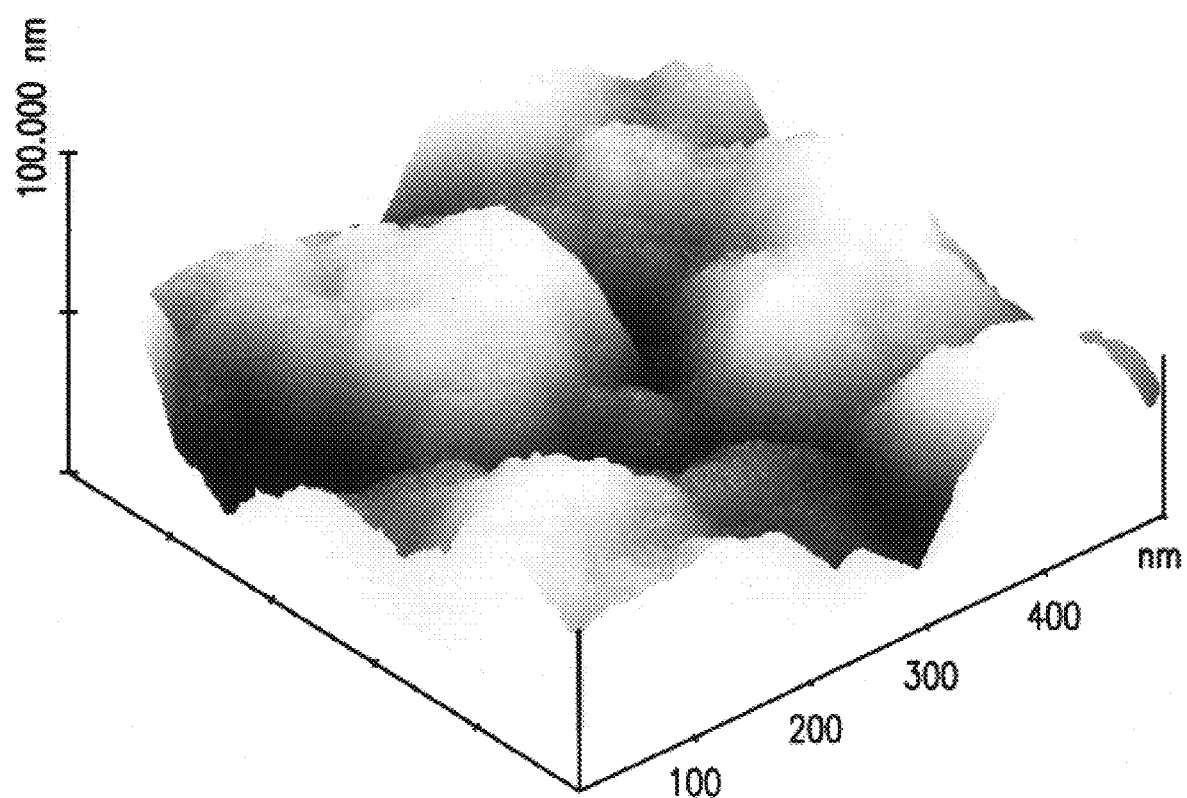

FIG. 2A shows an AFM micrograph for Sample 1, while FIG. 2B shows an AFM micrograph for Sample 2. The samples clearly exhibit significant different film morphology and surface topography.

Figure 2C:
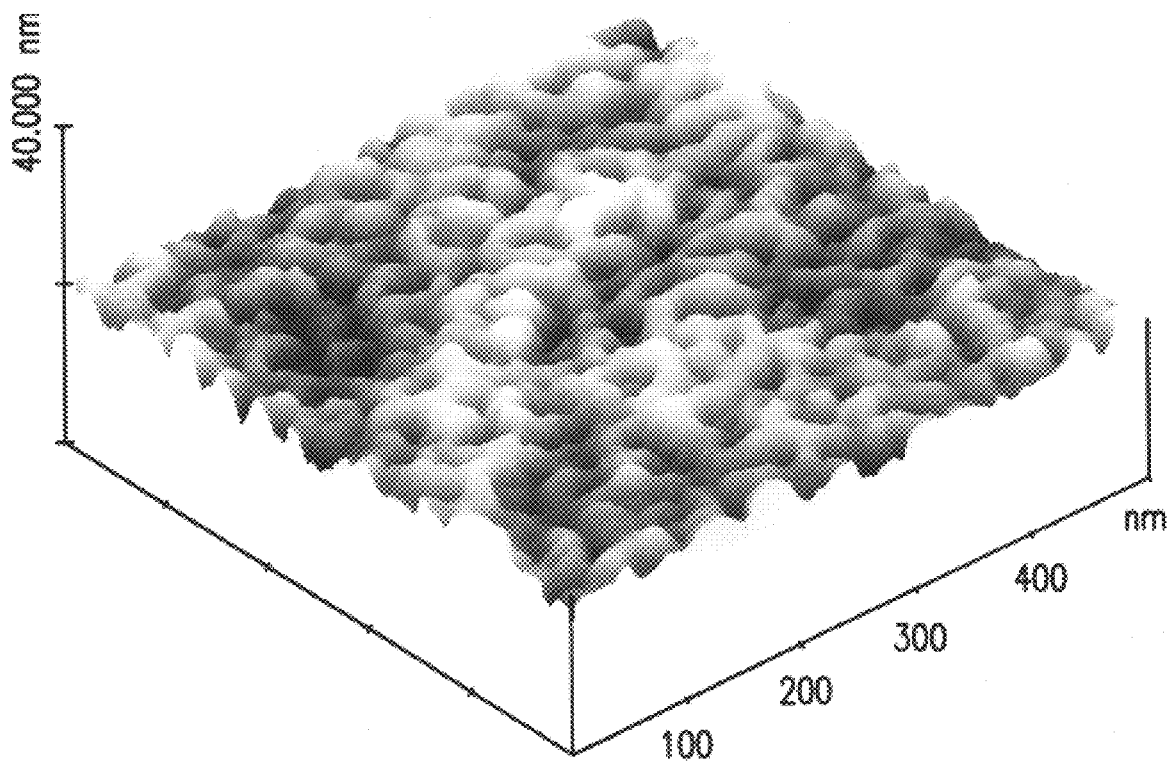
Figure 2D:
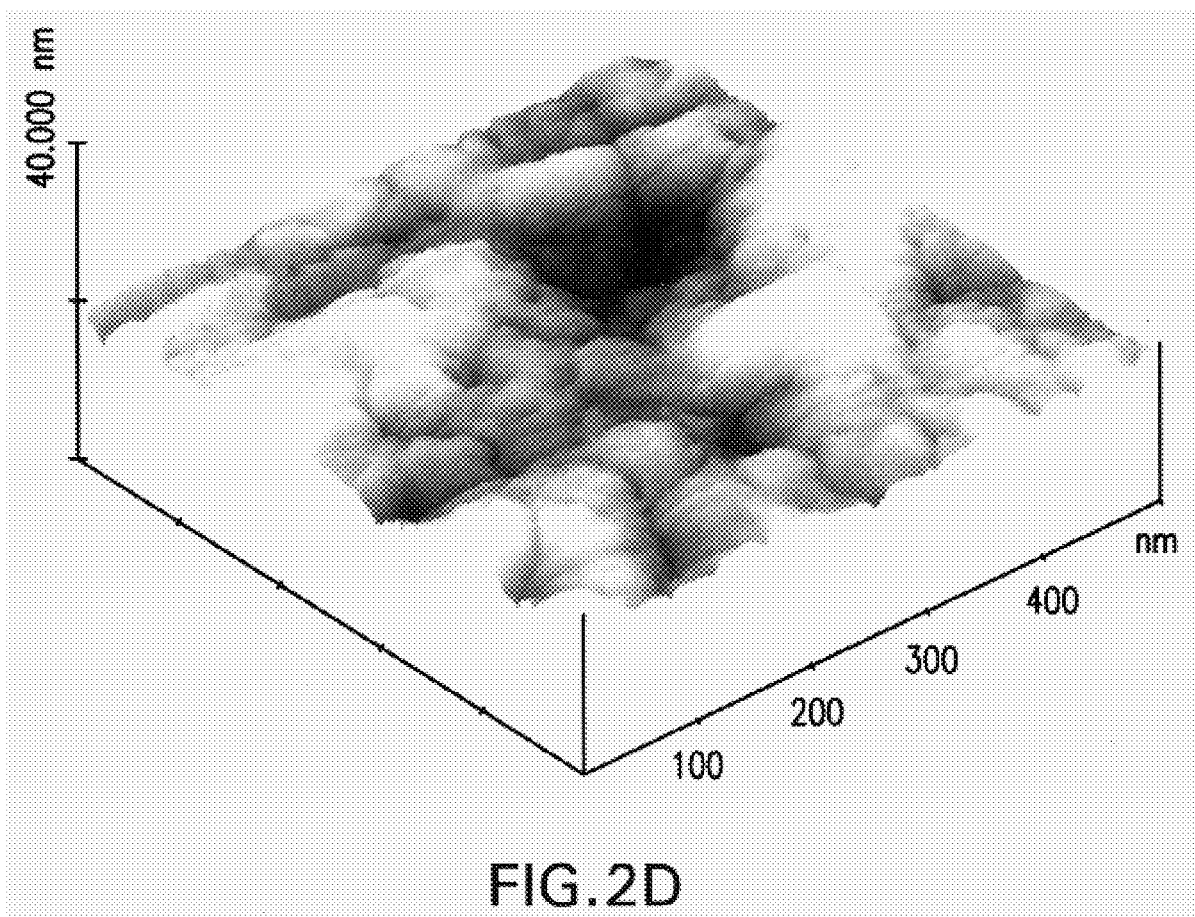

FIG. 2C shows an AFM micrograph for Sample 3, while FIG. 2D shows an AFM micrograph for Sample 4. These samples also exhibit quite different film morphology and surface topography.

Sample 1 shows that the morphological homogeneity of the underlayer on a submicron scale has a profound impact on SNR as reported in Table 1. On the other hand, the difference in morphology apparent by comparing FIGS. 2C and 2D are believed to evince the influence of surface energy differences between the underlayer and the subsequently deposited magnetic layer. The correlation between media noise and topography/submicron-scale morphology variations are apparent from a comparison of Sample 1 to Sample 2, and from a comparison of Sample 3 and Sample 4.

Figure 3A:
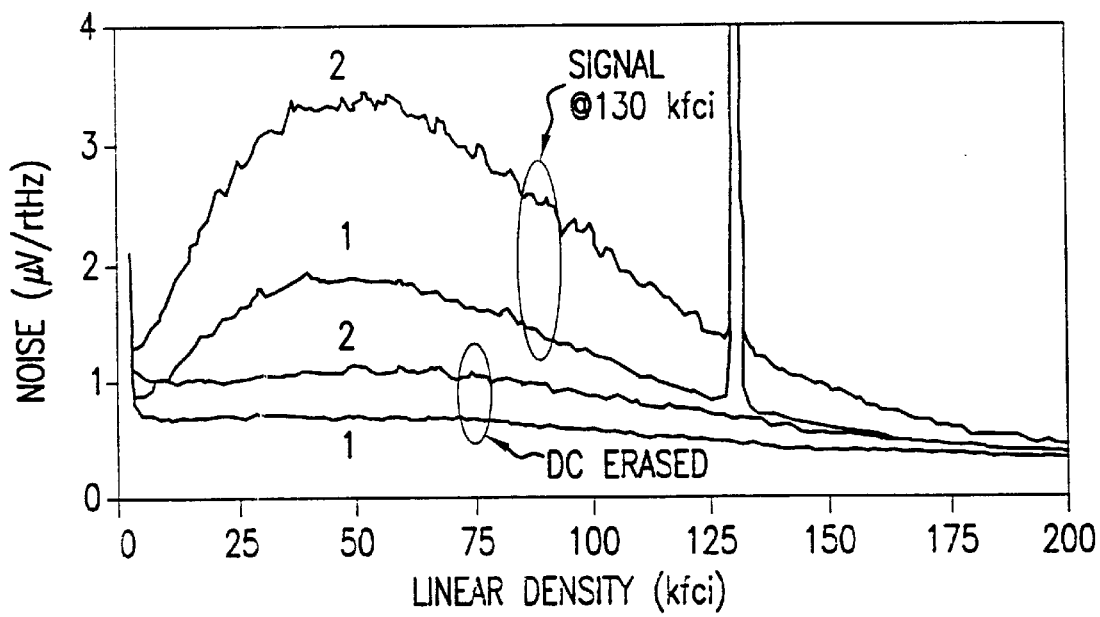
FIGS. 3A–4B show the noise spectra and SNR as a function of linear recording density for Samples 1 and 2 and for Samples 3 and 4, respectively.
Figure 3B:
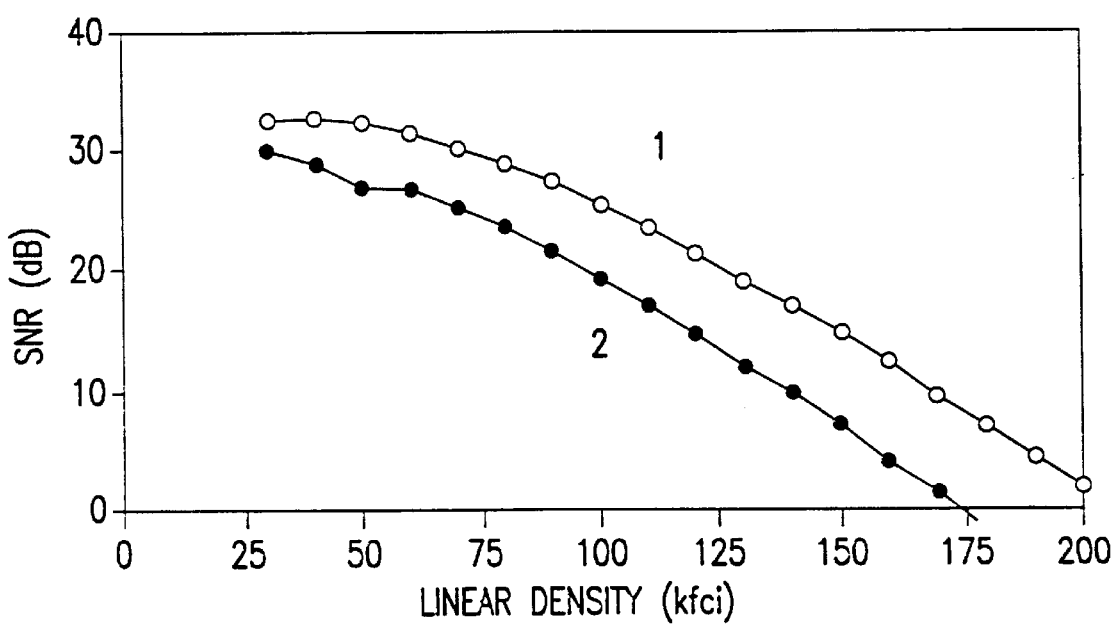
Figure 4A:
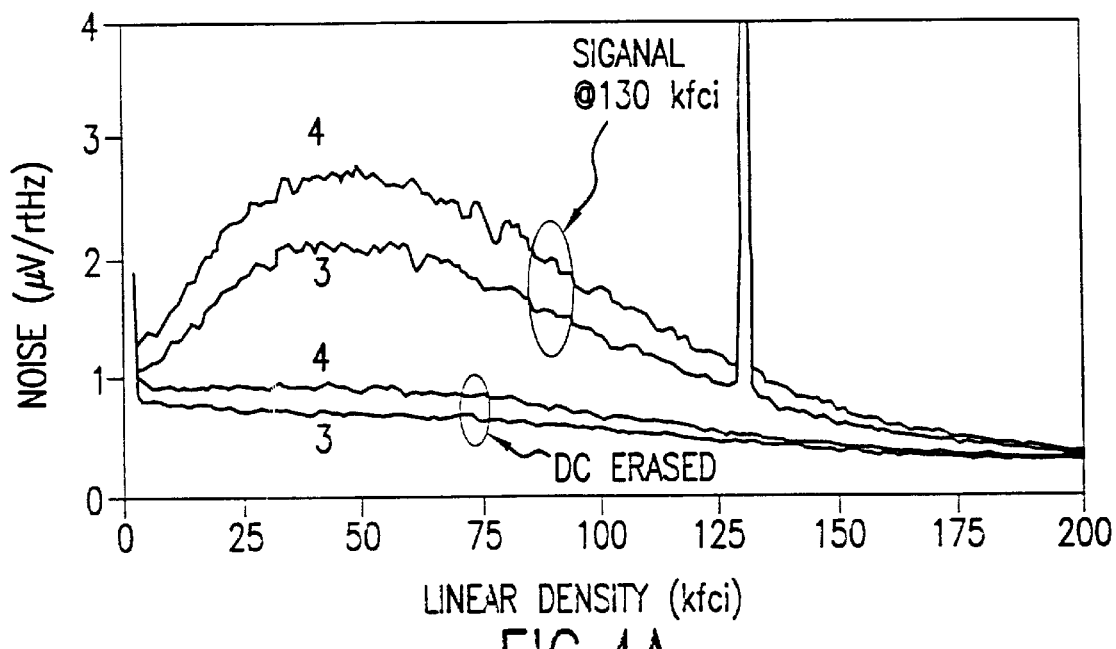
Figure 4B:
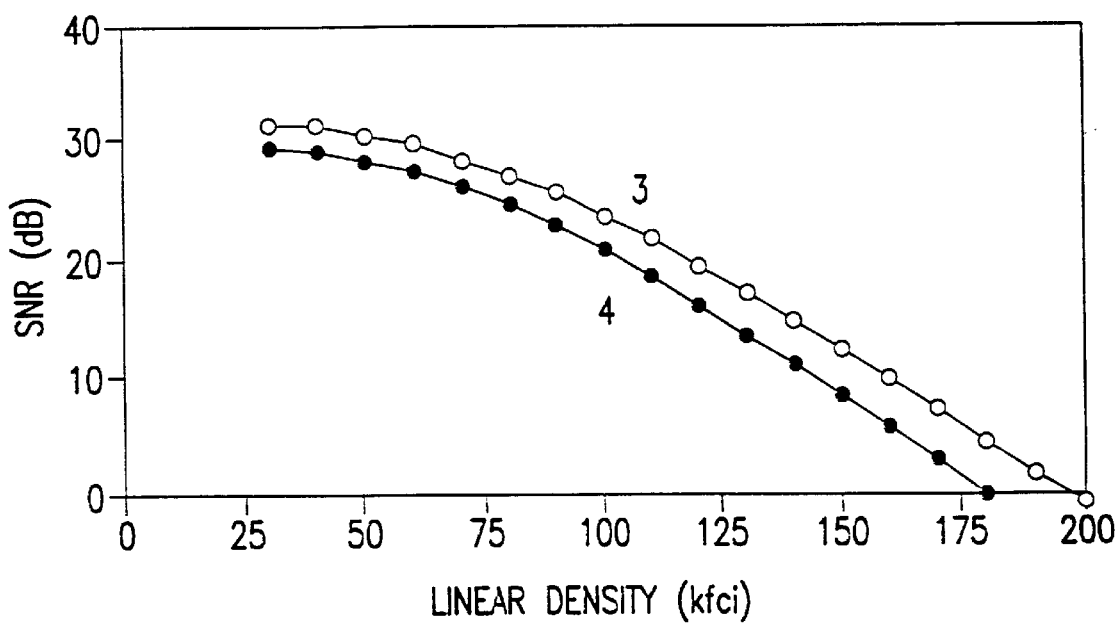

FIGS. 3 and 4 show the noise spectra and SNR as a function of linear recording density for Samples 1 and 2, and for Samples 3 and 4, respectively. The total media noise was determined for linear densities up to 200 kfci. The media noise was characterized in a DC erase state to specify the amount of topographically induced noise. In this state, there is no transition noise present and, consequently, surface roughness variations induce media noise. When DC erased, the rougher media, Samples 2 and 4, exhibit higher media noise, which is more pronounced for Sample 2 than for Sample 4. When AC written, the transition noise is added to the topographically induced noise as seen in the figures. It is apparent that the topographically induced noise essentially shifts the SNR curves. Sample 2 has a significantly lower SNR value compared to Sample 1; whereas Sample 4 also has lower SNR, but not as dramatically reduced as Sample 2.

Thus, in accordance with the present invention, substantially uniform sub-micron-scale morphology of a magnetic layer is achieved by engineering a pseudo-epitaxial growth mechanism which is predominantly layer by layer. This objective is attained by, inter alia, appropriate selection of the materials for the underlayer and magnetic layer and control of the deposition conditions of the underlayer, as at low pressure, high substrate temperature and high substrate bias. The uniform magnetic layer morphology obtained by the present invention keeps pace with the rapid evolution of thin film magnetic disks by achieving a high signal-to-noise ratio notwithstanding increasingly thinner magnetic layers and smoother substrates.

The present invention can be employed to produce any of various magnetic recording media, such as the magnetic recording medium depicted in FIG. 1. The present invention is not limited to the specific materials disclosed herein, but can comprise various underlayers and magnetic layers conventionally employed in producing magnetic recording medium, provided that the magnetic layer has a surface energy less than the surface energy of the underlayer, and, for longitudinal recording, the magnetic layer exhibits a (11$\bar{2}$0) or (10$\bar{1}$1) and (10$\bar{1}$0) crystallographic orientation.

Only the preferred embodiment of the invention and but a few examples of its versatility are shown and described in the present invention. It is to be understood that the invention is capable of use in various other combinations and environments and is capable of changes or modifications within the scope of the inventive concept as expressed herein.

We claim:

1. A magnetic recording medium comprising:
    a non-magnetic substrate;
    an underlayer formed on the magnetic substrate; and
    a magnetic layer, having a surface energy less than that of the underlayer and a thickness less than about 400 Å, pseudo-epitaxially grown predominantly layer by layer on a substantially isotropically smooth portion of the underlayer and having a substantially uniform sub-micron-scale morphology.

2. The magnetic recording medium according to claim 1, wherein the magnetic layer has a thickness less than about 200 Å.

3. The magnetic recording medium according to claim 2, wherein the magnetic layer has a thickness less than about 100 Å.

4. The magnetic recording medium according to claim 1, wherein the underlayer has a thickness of about 300 Å to about 800 Å.

5. The magnetic recording medium according to claim 1, wherein the magnetic layer comprises cobalt or a cobalt alloy, and the underlayer comprises a chromium alloy or a nickel-aluminum alloy.

6. The magnetic recording medium according to claim 5, wherein the magnetic layer exhibits a (11$\bar{2}$0) or (10$\bar{1}$1) and (10$\bar{1}$0) crystallographic orientation.

7. The magnetic recording medium according to claim 5, wherein the magnetic layer comprises an alloy of cobalt, chromium and tantalum.

8. The magnetic recording medium according to claim 5, wherein the underlayer comprises an alloy of chromium with vanadium, titanium, manganese and/or an alloying element which increases surface energy of Cr and simultaneously maintains the Cr (bcc) crystallographic structure.

9. The magnetic recording medium according to claim 8, wherein the underlayer comprises an alloy of chromium and about 10 to about 30 atomic percent vanadium.

10. The magnetic recording medium according to claim 1, wherein the magnetic layer has an $R_a$ less than about 15 Å.

11. The magnetic recording medium according to claim 10, wherein the magnetic layer has an $R_a$ less than about 10 Å.

12. A method of manufacturing a magnetic recording medium, which method comprises:
    depositing a non-magnetic underlayer on a non-magnetic substrate; and
    pseudo-epitaxially growing a magnetic layer having surface energy less than that of the underlayer and a thickness less than about 400 Å, Predominantly layer by layer on a substantially isotropically smooth portion of the underlayer, so that the pseudo-epitaxially grown magnetic layer exhibits a substantially uniform sub-micron-scale morphology.

13. The method according to claim 12, comprising pseudo-epitaxially growing the magnetic layer to a thickness of less than about 200 Å.

14. The method according to claim 13, comprising pseudo-epitaxially growing the magnetic layer to a thickness of less than about 100 Å.

15. The method according to claim 12, comprising controlling the deposition conditions of the underlayer to enable pseudo-epitaxially growing the magnetic layer predominantly layer by layer.

16. The method according to claim 15, comprising sputter depositing the underlayer at a pressure less than about 10 mTorr, substrate temperature greater than about 300° C. and substrate bias greater than about 300 V.

17. The method according to claim 12, wherein the underlayer comprises an alloy of chromium or a nickel-aluminum alloy.

18. The method according to claim 17, wherein the underlayer comprises an alloy of chromium and about 10 to about 30 atomic percent vanadium.

19. The method according to claim 12, wherein the magnetic layer comprises cobalt or an alloy of cobalt.

20. The method according to claim 19, wherein the magnetic layer comprises an alloy of cobalt, chromium and tantalum.

21. The method according to claim 12, comprising pseudo-epitaxially growing the magnetic layer with a $(11\bar{2}0)$ or $(10\bar{1}1)$ and $(10\bar{1}0)$ crystallographic orientation.

22. The method according to claim 12, wherein the pseudo-epitaxially grown magnetic layer has an $R_a$ less than about 15 Å.

23. The method according to claim 22, wherein the magnetic layer has an $R_a$ less than about 10 Å.

24. The method according to claim 12, wherein the underlayer comprises a chromium alloy containing from about 5 to about 30 atomic % of a member selected from the group consisting of molybdenum, vanadium, titanium, tantalum, tungsten and manganese.

* * * * *